(12) United States Patent
Guccione

(10) Patent No.: US 9,940,166 B2
(45) Date of Patent: Apr. 10, 2018

(54) ALLOCATING FIELD-PROGRAMMABLE GATE ARRAY (FPGA) RESOURCES

(71) Applicant: Bank of America Corporation, Charlotte, NC (US)

(72) Inventor: Steven A. Guccione, Austin, TX (US)

(73) Assignee: Bank of America Corporation, Charlotte, NC (US)

(*) Notice: Subject to any disclaimer, the term of this patent is extended or adjusted under 35 U.S.C. 154(b) by 67 days.

(21) Appl. No.: 14/799,949

(22) Filed: Jul. 15, 2015

(65) Prior Publication Data

US 2017/0017523 A1    Jan. 19, 2017

(51) Int. Cl.
| | | |
|---|---|---|
| G06F 3/00 | (2006.01) | |
| G06F 9/50 | (2006.01) | |
| G06F 9/48 | (2006.01) | |
| G06F 9/54 | (2006.01) | |

(52) U.S. Cl.
CPC .......... G06F 9/5011 (2013.01); G06F 9/4881 (2013.01); G06F 9/54 (2013.01)

(58) Field of Classification Search
CPC ........................................... G06F 9/54
USPC ....................................... 719/310
See application file for complete search history.

(56) References Cited

U.S. PATENT DOCUMENTS

| | | | | |
|---|---|---|---|---|
| 5,572,710 A | * | 11/1996 | Asano ................. | G06F 17/5027 703/15 |
| 5,777,887 A | * | 7/1998 | Marple ............ | H03K 19/17764 700/84 |
| 5,795,068 A | * | 8/1998 | Conn, Jr. .............. | G01K 7/245 374/141 |
| 7,058,921 B1 | | 6/2006 | Hwang et al. | |
| 8,918,784 B1 | | 12/2014 | Jorgensen et al. | |
| 9,294,097 B1 | * | 3/2016 | Vassiliev .......... | H03K 19/17704 |
| 2007/0239964 A1 | | 10/2007 | Denault | |
| 2009/0031111 A1 | * | 1/2009 | Chou ..................... | G06F 9/3836 712/207 |
| 2011/0113008 A1 | * | 5/2011 | Jafri .................. | G06F 17/30867 707/608 |
| 2011/0161630 A1 | * | 6/2011 | Raasch ............... | G06F 9/30196 712/205 |

(Continued)

OTHER PUBLICATIONS

Santa, FPGA-Based Digital Pulsewidth Modulator With Time Resolution Under 2 ns, Nov. 2008.*

Primary Examiner — Lechi Truong
(74) Attorney, Agent, or Firm — Michael A. Springs

(57) ABSTRACT

A system for allocating field-programmable gate array (FPGA) resources comprises a plurality of FPGAs operable to implement one or more pipeline circuits, the plurality of FPGAs comprising FPGAs of different processing capacities, and one or more processors operable to access a set of data comprising a plurality of work items to be processed according to a pipeline circuit associated with each of the plurality of work items, determine processing requirements for each of the plurality of work items based at least in part on the pipeline circuit associated with each of the plurality of work items, sort the plurality of work items according to the determined processing requirements, and allocate each of the plurality of work items to one of the plurality of FPGAs, such that no FPGA is allocated a work item with processing requirements that exceed the processing capacity of the FPGA.

20 Claims, 5 Drawing Sheets

(56) References Cited

U.S. PATENT DOCUMENTS

| | | | |
|---|---|---|---|
| 2013/0226764 A1* | 8/2013 | Battyani | G06Q 40/04 |
| | | | 705/37 |
| 2013/0346979 A1 | 12/2013 | Nightingale et al. | |
| 2015/0169376 A1 | 6/2015 | Chang et al. | |
| 2015/0199214 A1* | 7/2015 | Lee | G06F 9/505 |
| | | | 718/102 |

* cited by examiner

ALLOCATING FIELD-PROGRAMMABLE GATE ARRAY (FPGA) RESOURCES

TECHNICAL FIELD

This disclosure relates generally to allocating processing resources, and more particularly to allocating field-programmable gate array (FPGA) resources.

BACKGROUND

Enterprises often have to process large sets of data and often have limited time in which to process that data. Regulatory organizations, such as federal and state governments, may require that these data sets are processed by certain deadlines and may impose fines and/or sanctions if the data sets are not processed by the required deadlines. Enterprises may employ microprocessors (e.g., central processing units (CPUs)) to process the data sets, however, because processing by microprocessors is not deterministic, the time required to process data sets by microprocessors is difficult to estimate. Accordingly, in order to ensure that deadlines are met, enterprises allocate more microprocessors than are necessary to process the data sets.

Further, because it is difficult to estimate how long microprocessors will take to process data sets, it is difficult to detect processing errors. Traditional systems may rely on a "timeout" approach to detect processing errors, where the processing time for the microprocessor is roughly estimated and applied to a long "timeout delay," such that if the actual processing time exceeds the "timeout delay," a processing error is assumed. However, because processing using microprocessors involves software processing, which is non-deterministic, it is difficult to estimate how long microprocessors will take to process data sets and these timeout delays are set to unreasonable large numbers. As such, in practice, timeout delays are often ignored.

Moreover, the processing requirements for data may vary and the processing capacity of processing resources may vary. Often, the processing requirements for a data set are not optimized for the processing capabilities of available processing resources. This can lead to inefficient allocation of processing resources, such as high processing capacity processing resources being allocated to data with low processing requirements while data with higher processing requirements is queued for processing because available processing resources, which could have processed the data allocated to the processing resources processing the data with low processing requirements, are unable to process the data with high processing requirements.

SUMMARY OF EXAMPLE EMBODIMENTS

According to embodiments of the present disclosure, disadvantages and problems associated with providing internal services to external enterprises may be reduced or eliminated.

In certain embodiments, a system for allocating field programmable gate array (FPGA) resources, comprises a plurality of FPGAs operable to implement one or more pipeline circuits; and one or more processors operable to determine the size of a set of data to be processed, determine an amount of time available to process the data set, determine an operational clock speed for the plurality of FPGAs, determine, based at least in part on the determined size of the set of data, the determined amount of time, and the determined operational clock speed, a number of FPGAs to allocate to process the set of data within the determined amount of time, and allocate at least the determined number of the plurality of FPGAs to process the set of data.

In particular embodiments, a system for allocating field-programmable gate array (FPGA) resources comprises a plurality of FPGAs operable to implement one or more pipeline circuits, the plurality of FPGAs comprising FPGAs of different processing capacities, and one or more processors operable to access a set of data comprising a plurality of work items to be processed according to a pipeline circuit associated with each of the plurality of work items, determine processing requirements for each of the plurality of work items based at least in part on the pipeline circuit associated with each of the plurality of work items, sort the plurality of work items according to the determined processing requirements, and allocate each of the plurality of work items to one of the plurality of FPGAs, such that no FPGA is allocated a work item with processing requirements that exceed the processing capacity of the FPGA.

Certain embodiments of the present disclosure may provide one or more technical advantages having specific technical effects.

In certain embodiments, the system determines a minimum number of FPGAs to allocate to process a data set within an available time, thereby conserving FPGA resources consumed by over allocating FPGAs to ensure that data sets are processed within the available time.

In an embodiment, the system determines the amount of time an allocated number of FPGAs will need to process a data set and generates an error notification if the processing time for the FPGAs exceeds the determined processing time, thereby allowing for faster processing of data sets by identifying processing errors in real-time.

In particular embodiments, the system categorizes data within data sets based on processing requirements of the data and categorizes FPGAs based on processing capacity, then allocates FPGAs to data based on the category of FPGA and the category of the data, thereby conserving FPGA resources consumed by allocating high processing capacity FPGAs to data with low processing requirements.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

In an embodiment, the number of FPGAs necessary to process a data set is determined based on one or more of the size of the data set, the amount of time available to process the data set, the operational clock speed of the FPGAs, the depth of a pipeline circuit implemented on the FPGAs, and the processing requirements of the pipeline circuit implemented on the FPGAs (e.g., number of clock cycles per output).

Further, the amount of time (or number of clock cycles) necessary to process the data set by the allocated FPGAs can be determined in real-time, and processing errors can be detected if the actual processing time (or clock cycles) exceeds the determined processing time (or clock cycles). This determination can be accurate to the clock cycle, which for a clock speed of 1 GHz would be accurate to the nanosecond. Accurate prediction of completion allows for real-time error detection. In the event an error is detected, an alert to a user may be generated and different FPGAs may be allocated to the data set.

Data within data sets may also be categorized based on the processing requirements of the data, and FPGAs may be categorized based on the processing capabilities of the FPGAs. FPGAs may be allocated to data (or vice versa) based on the categorization of the FPGAs and the data to provide efficient allocation of FPGA resources.

Figure 1:
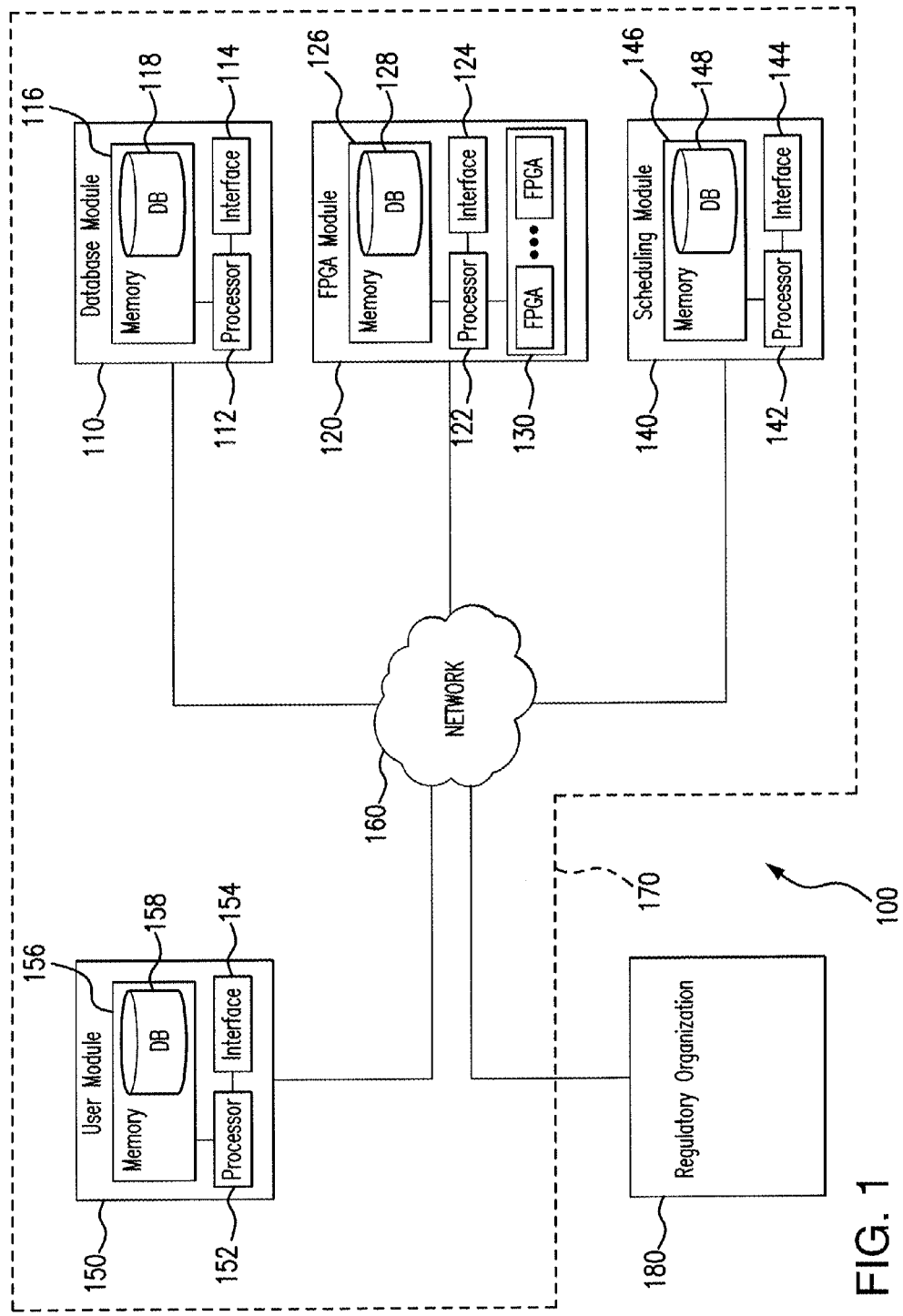
FIG. 1 illustrates an example system for allocating field-programmable gate array (FPGA) resources.

FIG. 1 illustrates an example system 100 for allocating field-programmable gate array (FPGA) resources. According to an embodiment, system 100 includes database module 110, FPGA module 120, which may include a plurality of FPGAs 130, scheduling module 140, user module 150, network 160, and enterprise 170. System 100 may further communicate with one or more regulatory organizations 180.

Database module 110 represents a component of system 100 operable to maintain one or more data sets. In an embodiment, data sets are associated with one or more pipeline circuits operable to process the data sets. The pipeline circuits associated with the data sets may implement an algorithm (e.g., hardware processing) corresponding to the processing requirements of the data set. In particular embodiments, data sets have a deadline by which the data sets must be processed. The type of processing and/or the deadline by which the data sets must be processed may be governed by regulatory organizations 180. In certain embodiments, different data sets are associated with different pipeline circuits and/or algorithms, and the different pipeline circuits and/or algorithms may have different processing requirements. For example, more complex algorithms require pipeline circuits utilizing more logic gates and/or look-up-tables (LUTs), which require larger FPGAs with more processing capacity. A metric for comparing processing requirements of a pipeline circuit is the number of logic gates and/or LUTs required to implement the pipeline circuit on one of FPGAs 130. The more logic gates required for a pipeline circuit, the higher the processing capacity required in the FPGA, and the more expensive the FPGA. FPGA prices can range from a few dollars per FPGA to tens of thousands of dollars per FPGA. Data sets may be of different sizes. In certain embodiments, the size of data sets is measured in the number of data items in the data set. A data item represents an amount of data loaded in the pipeline circuit per clock cycle. Data sets may include any suitable information. In particular embodiments, data sets include information related to financial transactions (e.g., trades, options to be priced, etc.) or reporting requirements promulgated by regulatory organizations 180.

FPGA module 120 represents a component of system 100 operable to process data sets from database module 110 with one or more of a plurality of FPGAs 130. In an embodiment, FPGA module 120 is communicatively coupled to database module 110 and is operable to process datasets from database module 110 with one or more FPGAs 130. FPGA module 120 may be operable to program FPGAs 130 and/or to dynamically reprogram FPGAs 130. In certain embodiments, FPGA module 120 programs FPGAs 130 to implement particular pipeline circuits. FPGA module 120 may be further operable to dynamically reconfigure FPGAs 130 to implement a number of different pipeline circuits. In particular embodiments, FPGA module 120 includes one or more of processor 122, interface 124, memory 126, and database 128.

FPGAs 130 represent integrated circuits that contain an array of programmable logic blocks and reconfigurable interconnects that allow the programmable logic blocks to be interconnected in different configurations. The programmable logic blocks may be configured to simulate hardware elements such as combinational logic and logic gates. FPGAs 130 may be configured using a hardware description language (HDL). In certain embodiments, one or more of FPGAs 130 may be dynamically reconfigurable. Different FPGAs 130 may have different processing capacities (e.g., large FPGAs 130 may have large processing capacities while small FGPAs 130 may have small processing capacities).

In an embodiment, FPGAs 130 implement certain algorithms, for example, through pipeline circuits programmed into the FPGAs 130. Algorithms implemented in pipeline circuits may be referred to as pipelined algorithms. In particular embodiments, pipelined circuits implementing processing algorithms for data sets may have different pipeline depths. The pipeline depth of a pipeline circuit represents the number of clock cycles between when data is input to the pipeline circuit and when the results are output from the pipeline circuit. An FPGA 130 programmed to implement a particular algorithm through a programmed pipeline circuit may represent an application specific integrated circuit (ASIC), as distinguished from a general purpose computer (e.g., a microprocessor).

Pipeline circuits implemented in FPGAs 130 are deterministic, unlike microprocessors, and the processing time for FPGAs 130 can be accurately determined (e.g., within a clock cycle) based on the processing requirements of the data set (e.g., the number of clock cycles per result), the size of the data set (e.g., number of data items), the pipeline depth of the pipeline circuit implemented on the FPGA 130, and the operational clock speed the FPGA 130:

$$\text{total processing time} = ((\text{number of clock cycles per output} * \text{number of data items in data set}) + (\text{pipeline depth} * 2))/\text{operational clock speed}$$

For large data sets, the pipeline depth has a negligible impact on the calculation and may be ignored. In practice, the processing time for FPGAs 130 can be accurately predicted within a clock cycle. The previous example, and equation, represent a simplified embodiment. Pipeline circuits can be implemented in different ways and those changes would have a corresponding factor on the equation. For example, if FPGAs 130 were performing a Monte Carlo simulation (where inputs may be re-used) with 10,000 iterations, the equation above would be scaled by a corresponding factor of 10,000.

Scheduling module 140 represents a component of system 100 operable to allocate FPGAs 130 to data sets (or vice versa). In certain embodiments, scheduling module 140 is operable to determine a number of FPGAs 130 to allocate to a data set in order to process the data set within a particular time. Scheduling module 140 may determine a number of FPGAs 130 to allocate to a data set based on one or more of the amount of time available to process the data set, an operational clock speed (e.g., maximum operational clock speed) of FPGAs 130, the pipeline depth of the pipeline circuits implemented in FPGAs 130, the processing requirements of the algorithm performed by the pipeline circuit implemented in FPGAs 130 (e.g., the number of iterations per result), and the size of the data set (e.g., the number of data items). To determine the minimum necessary number of FPGAs 130, scheduling module 140 may divide the available time by the determined processing time per FPGA:

minimum # of FPGAs=total processing time/available time

Scheduling module 140 may further be operable to determine the amount of time (or number of clock cycles) required to process a data set. In an embodiment, scheduling module 140 is operable to perform error detection by tracking the amount of time (or number of clock cycles) FPGAs 130 have been processing a data set and then generating an alert (e.g., to a user) if the actual processing time (or clock cycles) exceeds the determined processing time (or clock cycles). In this way, scheduling module 140 can provide real-time error detection without the unnecessary delay of timeout delays used for error detection in microprocessors.

In certain embodiments, scheduling module 140 is further operable to categorize data (e.g., work items) within a data set, for example, according to the processing requirements of the work items, and to categorize FPGAs 130 for example, according to the processing capacity of FPGAs 130. Scheduling module 140 may allocate FPGAs 130 to work items within a data set according to the respective categories of the work items and FPGAs 130. In particular embodiments, scheduling module 140 includes one or more of processor 142, interface 144, memory 146, and database 148.

User module 150 represents a component of system 100 operable to allow users of system 100 to interact with system 100. For example, user module 150 may allow users to load data sets, perform maintenance on FPGAs 130, set allocation and/or categorization criteria for scheduling module 140, set error detection criteria for scheduling module 140, receive error detection messages from scheduling module 140, input deadlines for data sets to scheduling module 140, adjust the operational clock speed of one or more FPGAs 130 or other components of system 100 communicatively coupled to FPGAs 130, configure FPGAs 130, dynamically reconfigure FPGAs 130, receive and/or view processing results of FPGAs 130, or any other suitable interaction with system 100. In particular embodiments, user module 150 includes one or more of processor 152, interface 154, memory 156, and database 158.

Network 160 represents any suitable network operable to facilitate communication between components of system 100, such as database module 110, FPGA module 120, scheduling module 140, user module 150, and network 160. Enterprise 170. Network 160 may include any interconnecting system capable of transmitting audio, video, electrical signals, optical signals, data, messages, or any combination of the preceding. Network 160 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100 and third party enterprises 160.

Enterprise 170 represents an entity that maintains and/or operates database module 110, FPGA module 120, scheduling module 140, user module 150, and network 160. Enterprise 170 may be any suitable type of business entity. In certain embodiments, enterprise 170 has different business units or subdivisions that handle different business activities. Different subdivisions of enterprise 160 may maintain and/or operate one or more of database module 110, FPGA module 120, scheduling module 140, user module 150, and network 160. In particular embodiments, enterprise 170 may include organizations such as commercial banks, savings and loan associations, credit unions, Internet banks, mutual fund companies, brokerage firms, credit card companies, or other provider of electronic transaction services.

Regulatory organizations 180 represents organizations with authority over enterprise 170. In certain embodiments, regulatory organizations 180 are government entities (e.g., court, legislature, executive, agency, or other government entity), trade groups, standards organizations, or other entity with regulatory authority over enterprise 170. Regulatory organizations 180 may promulgate regulations applicable to enterprise 170. In certain embodiments, regulatory organization 180 communicates regulatory criteria applicable to enterprise 170 to enterprise 170. Enterprise 170 may communicate information indicating compliance with regulatory criteria to regulatory organizations 180. In an embodiment, regulatory organizations 180 require that data sets be processed by particular deadlines and impose fines and/or sanctions on enterprise 170 if those deadlines are not met.

A module (e.g., modules 110, 120, 140, and 150) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Components of system 100, such as database module 110, FPGA module 120, scheduling module 140, and user module 150, may include one or more processors. A processor represents any computing device, such as processors 112, 122, 142, and 152, configured to control the operation of one or more components of system 100. A processor may comprise one or more processors and may be a programmable logic device, a microcontroller, a microprocessor, any suitable processing device, or any suitable combination of the preceding. A processor includes any hardware or software that operates to control and process information received by a component of system 100. In certain embodiments, a processor communicatively couples to other components of system 100, such as a module (e.g., modules 110, 120, 140, and 150), an interface (e.g., interfaces 114, 124, 144, and 154), a memory (e.g., memories 116, 126, 146, and 156), a database (e.g., databases 118, 128, 148, and 158), or any other suitable component.

An interface represents any device, such as interfaces 114, 124, 144, and 154 operable to receive input, send output, process the input or output, or perform other suitable operations for a component of system 100. An interface includes any port or connection, real or virtual, including any suitable hardware or software, including protocol conversion and data processing capabilities, to communicate through network 150. In certain embodiments, an interface includes a user interface (e.g., physical input, graphical user interface, touchscreen, buttons, switches, transducer, or any other suitable method to receive input from a user).

A memory represents any device, such as memories 116, 126, 146, and 156 operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases (e.g., databases 118, 128, 148, and 158).

Logic may perform the operation of any component of system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

In an embodiment of operation, scheduling module 140 is operable to determine the number of FPGAs 130 necessary to allocate for processing a data set based on one or more of the size of the data set, the amount of time available to process the data set, the operational clock speed of FPGAs 130, the depth of the pipeline circuit implemented on FPGAs 130, and the processing requirements (e.g., clock cycles per output) of the pipeline circuit implemented on FPGAs 130.

In an example, a data set with 10 million data items needs to be processed according to Algorithm X in 1 hour. Algorithm X is implemented in a 10-deep pipeline circuit with processing requirements of 1 million clock cycles per output on FPGAs 130, which can be operated at 200 MHz. The total processing time to process the data set is described by the equation below:

total processing time=((number of clock cycles per output*number of data items in data set)+(pipeline depth*2))/operational clock speed Inserting the information from the example above yields:

total processing time=(((1,000,000 clock cycles per output*10,000,000 data items)+(pipeline depth of 10*2))/200,000,000 Hz)=50,000.5 seconds=13.889 hours of FPGA processing time.

Accordingly, to meet the deadline of 1 hour, the minimum number of FPGAs 130 is 14 (rounding up from 13.889). As can be seen from the example, for large data sets the impact of the pipeline depth is negligible and can be ignored.

Accordingly, in the example above, scheduling module 140 can allocate 14 FPGAs 130 to the data set and be completed in under 1 hour. Scheduling module 140 may also allocate 13 FPGAs 130 for 1 hour and a 14th FPGA 130 for 0.889 hours to maximize efficiency.

Further, due to the deterministic nature of FPGAs 130, scheduling module 140 can accurately predict the time processing of the data set will be completed. This determination can be accurate to the clock cycle. Accurate prediction of completion allows for real-time error detection. Scheduling module 140 can determine the processing time (or the number of clock cycles) for the data set and, if the processing time exceeds the determined processing time (or number of clock cycles), determine that an error has occurred in processing the data set. Scheduling module 140 may generate an alert notifying users that an error has occurred in processing the data set. In certain embodiments, scheduling module 140 is operable to dynamically reassign processing of the data set to a different set of FPGAs 130 after detecting an error in processing the data set.

In another embodiment of operation, scheduling module 140 is operable to categorize data within a data set, for example, according to the processing requirements of the data. For example, a data set or a plurality of data sets, may be comprised of data (e.g., work items) with a number of different processing requirements (which may be reflected by the number of clock cycles per output). Some work items have large processing requirements (e.g., a large number of iterations/output) and require FPGAs 130 with larger processing capacities than other work items that have lower processing requirements. In certain embodiments, scheduling module 140 categorizes work items in data sets according to the processing requirements of the work items. The categories may be associated with the processing capacities (e.g., size) of available FPGAs 130 (where larger FPGAs 130 can process work items with a larger processing requirements). The categorization of the work items according to the processing requirements of the work items may be referred to as a "work profile." In an embodiment, scheduling module 140 is further operable to categorize FPGAs 130 according to the processing capacity of FPGAs 130.

In particular embodiments, scheduling module 140 is operable to allocate FPGAs 130 to work items in data sets according to the processing requirements of the work item and the processing capacity of FPGAs 130. In an example, scheduling module 140 may categorize FPGAs 130 and work items according into three groups, where the first group of work items includes the work items with the largest level of processing requirements, the second group of work items includes the work items with a middle level of processing requirements, and the third group of work items includes the work items with the smallest processing requirements.

Scheduling module 140 may further categorize FPGAs 130 such that the first group of FPGAs 130 includes the FPGAs 130 with the highest level processing capacity (e.g., a minimum processing capacity greater than the maximum processing requirements of a work item in the first group of work items), the second group of FPGAs 130 includes the FPGAs 130 with a middle level of processing capacity (e.g., a minimum processing capacity greater than the maximum processing requirements of a work item in the second group of work items, but not guaranteed to be greater than the processing requirements of a work item in the first group of work items), and the third group of FPGAs 130 includes the FPGAs 130 with the lowest level of processing capacity (e.g., a minimum processing capacity greater than the maximum processing requirements of a work item in the third group of work items, but not guaranteed to be greater than the processing requirements of a work item in the first second group of work items).

Scheduling module 140 may allocate work items to FPGAs 130 such that the first group of FPGAs 130 can be allocated work items from any of the first, second, or third groups of work items, the second group of FPGAs 130 can be allocated work items from any of the second or third groups of work items, and the third group of FPGAs 130 can be allocated work items from the third group of work items. In certain embodiments, scheduling module 140 allocates the first group of FPGAs 130 work items from the first group of work items, then the second group of work items, and then the third group of work items until the first group of FPGAs 130 are all fully allocated, allocates the second group of FPGAs 130 work items from the second group of work items, and then the third group of work items until the second group of FPGAs 130 are fully allocated, and allocates the third group of FPGAs 130 work items from the third group of work items until the third group of FPGAs 130 are fully allocated.

Categorizing work items and FPGAs 130, and allocation of FPGAs 130 according to the processing requirements of work items and the processing capacities of FPGAs 130, is discussed in more detail below with respect to FIG. 4 below.

Modifications, additions, or omissions may be made to system 100. System 100 may include more, fewer, or other components. Any suitable component of system 100 may include a processor, interface, logic, memory, or other suitable element.

Figure 2:
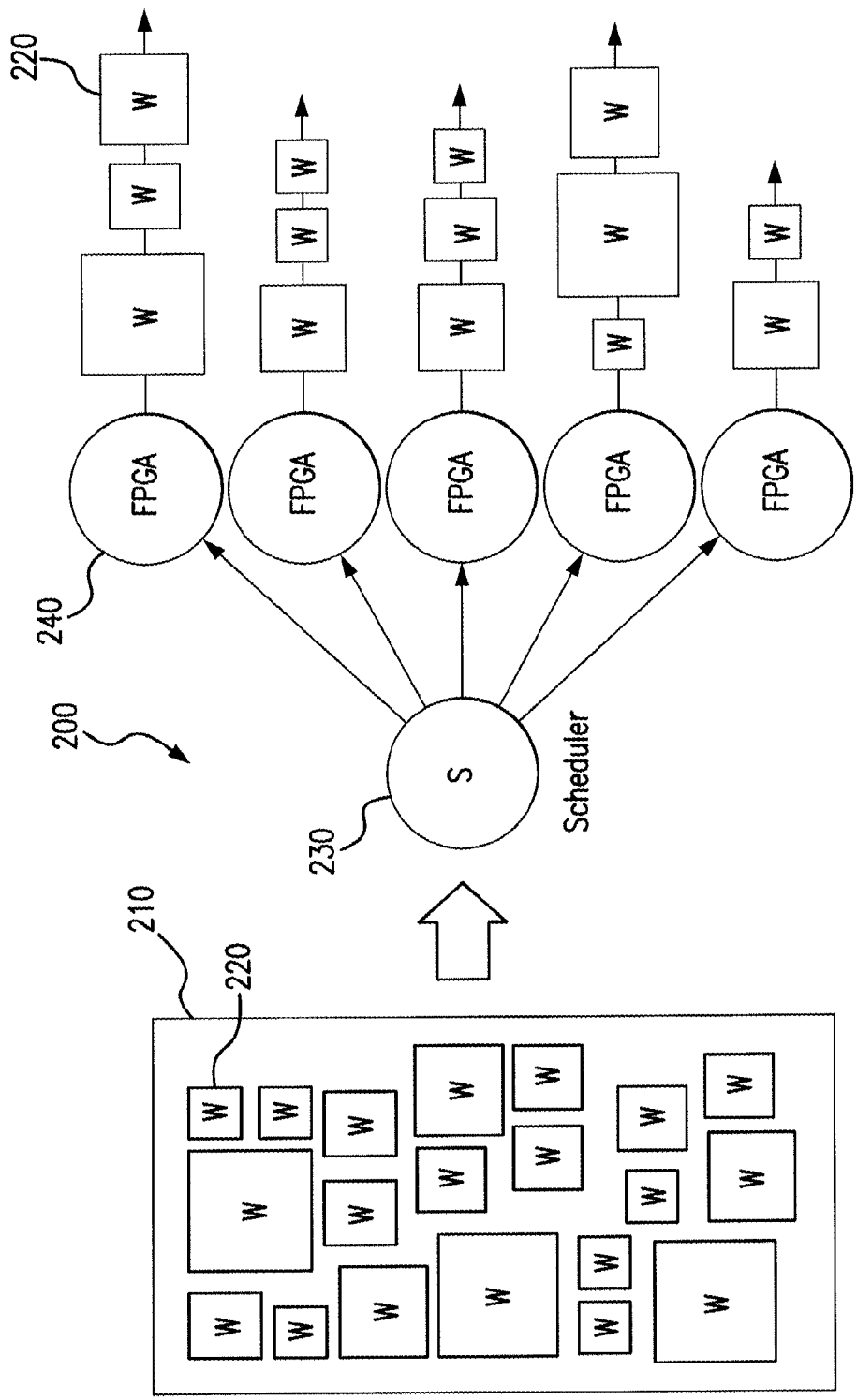
FIG. 2 illustrates a block diagram of an example system for allocating field-programmable gate array (FPGA) resources.

FIG. 2 illustrates a block diagram of an example system 200 for allocating field-programmable gate array (FPGA) resources. According to an embodiment, system 200 includes data set 210, work items 220, scheduler 230, and FPGAs 240.

Data set 210 represents data that needs to be processed. In an embodiment, data set 210 is associated with a pipeline circuit implemented on FPGAs 240. Pipeline circuits implemented on FPGAs 240 may perform particular algorithms associated with the processing requirements of data set 210. Data set 210 may be comprised of plurality of work items 220.

Work items 220 represent subsets of data sets 210 that need to be processed. Work items 220 may need to be processed according to the same algorithm or different algorithms. The algorithms corresponding to work items 220 may be performed by pipeline circuits implemented in FPGAs 240. In an embodiment, FPGAs 240 are operable to be dynamically reconfigured such that a single FPGA 240 may execute different pipeline circuits performing different algorithms.

Scheduler 230 is operable to determine the number of FPGAs 240 (e.g., the minimum number) necessary to process the work items 220 in data set 210 within an available time. In an embodiment, scheduler 230 determines the number of FPGAs 240 necessary to process data set 210 within an available time based on one or more of the size of the data set, the processing requirements of data set 210 (e.g., the number of clock cycles per output), the size of data set 210 (e.g., the number of data items), the depth of the pipeline circuit performing the algorithm implemented on FPGAs 240, an operational clock speed of FPGAs 240 (e.g., the maximum clock speed of FPGAs 240), and the amount of time available. Scheduler 230 may further be operable to determine the amount of time (or number of clock cycles) necessary to process data set 210 with the allocated FPGAs 240. In an embodiment, scheduler 230 is operable to detect processing errors and/or alert users of processing errors if the processing time (or number of clock cycles) of the allocated FPGAs 240 exceeds the determined processing time (or number of clock cycles). As FPGAs 240 are deterministic, the processing time can be determined within the clock cycle. Accordingly, scheduler 230 is operable to provide real-time processing error detection.

FPGAs 240 represent integrated circuits that contain an array of programmable logic blocks and reconfigurable interconnects that allow the programmable logic blocks to be interconnected in different configurations. The programmable logic blocks may be configured to simulate hardware elements such as combinational logic and logic gates. FPGAs 240 may be configured using a hardware description language (HDL). In certain embodiments, one or more of FPGAs 240 may be dynamically reconfigurable. FPGAs 240 may implement certain algorithms, for example, through pipeline circuits programmed into the FPGAs 240. Algorithms implemented in pipeline circuits may be referred to as pipelined algorithms. In particular embodiments, pipelined circuits implementing processing algorithms for data sets may have different pipeline depths. The pipeline depth of a pipeline circuit represents the number of clock cycles between when data is input to the pipeline circuit and when the results are output from the pipeline circuit.

In the illustrated embodiment, scheduler 230 determines the number of FPGAs 240 necessary to allocate to data set 210 in order to process data set 210 within an available time. (e.g., by a deadline). In certain embodiments, the deadline may be required by regulatory organizations 180 and regulatory organizations 180 may fine and/or sanction enterprise 170 if the data set is not processed by the deadline. Scheduler 230 may have a number of data sets and a number of deadlines, and may determine an available time to process a data set based on one or more of the available FPGAs 240, the number of data sets 210 that need to be processed, and deadlines associated with the number of data sets 210 that need to be processed.

In an embodiment, scheduler 230 determines an available time to process data set 210, and determines the necessary number of FPGAs 240 to process data set 210 within the available time based on one or more of the size of data set 210, the processing requirements of data set 210 (e.g., the number of clock cycles per result), the pipeline depth of pipeline circuits implementing the algorithm to process data set 210, the operational clock speed of FPGAs 240 (e.g., the maximum operational clock speed), and the determined available time. In an embodiment, scheduler 230 is operable to determine the amount of time (or clock cycles) necessary for the allocated number of FPGAs 240 to process data set 210. Scheduler 230 may generate an alert to a user and/or re-allocate data set 210 to different FPGAs 240 if the processing time (or number of clock cycles) exceeds the determined processing time (or number of clock cycles), thereby providing real-time processing error detection.

Modifications, additions, or omissions may be made to system 200. System 200 may include more, fewer, or other components. Any suitable component of system 200 may include a processor, interface, logic, memory, or other suitable element.

Figure 3:
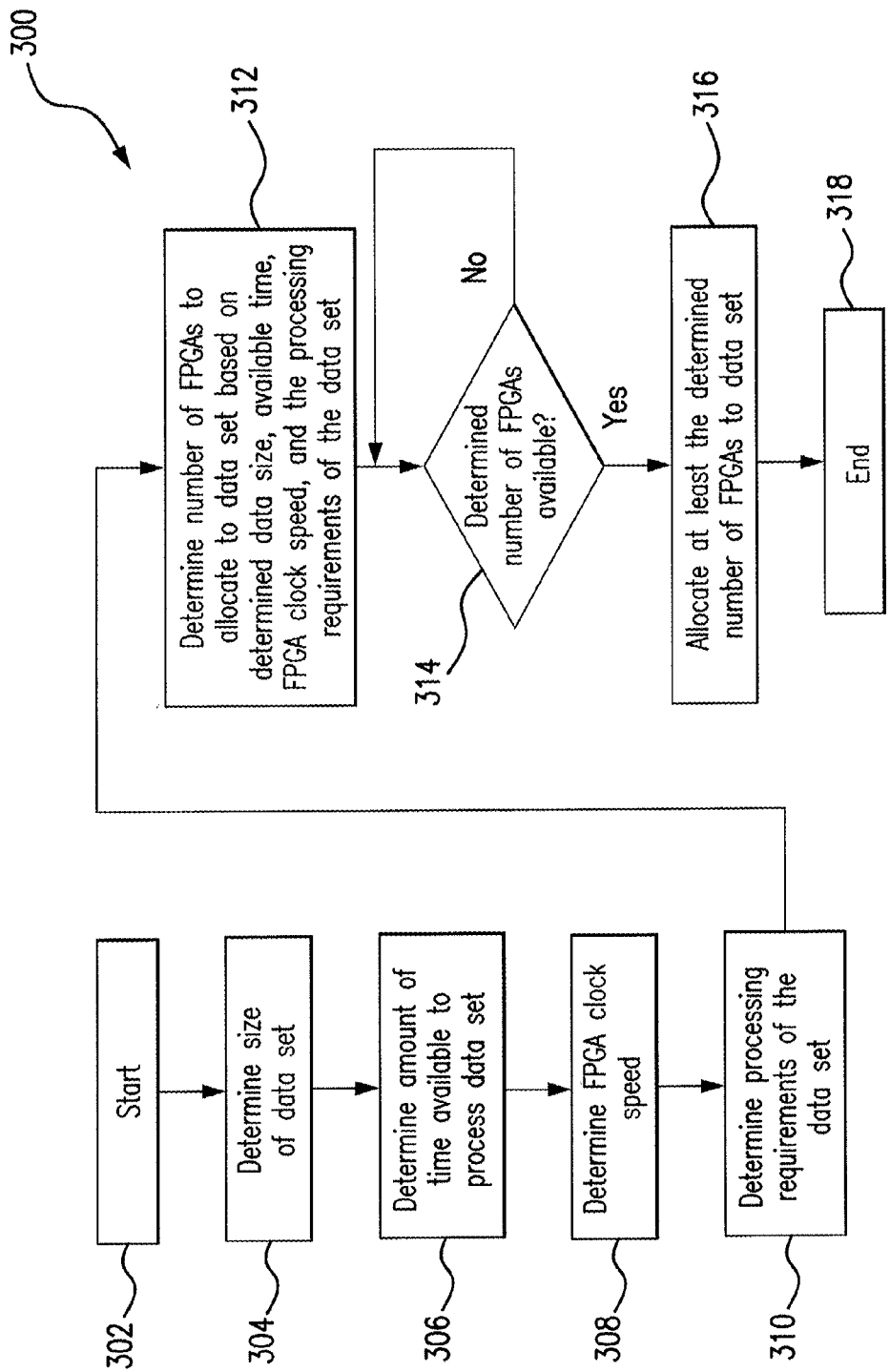
FIG. 3 illustrates a flow diagram of an example method for allocating field-programmable gate array (FPGA) resources, according to certain embodiments of the present disclosure.

FIG. 3 illustrates a flow diagram of an example method 300 for allocating field-programmable gate array (FPGA) resources, according to certain embodiments of the present disclosure. Method 300 begins at step 302. At step 304, the size of a data set is determined (e.g., by scheduling module 140). Method 300 continues to step 306 where the time available to process the data set is determined (e.g., by scheduling module 140). At step 308, the operational clock speed (e.g., the maximum clock speed) of a plurality of FPGAs is determined (e.g., by scheduling module 140). At step 310, the processing requirements (e.g., clock cycles per output) of the data are determined (e.g., by scheduling module 140). At step 312, the number of FPGAs necessary to process the data set in the available amount of time is determined (e.g., by scheduling module 140) based on the determined size of the data set, the determined available time, the determined FPGA operational clock speed, and the determined processing requirements for the data. At step 314, it is determined (e.g., by scheduling module 140) whether the determined number of FPGAs is available. If the determined number of FPGAs is not available, the method returns to step 314. If the determined number of FPGAs is available, the method continues to step 316. At step 316 at least the determined number of FPGAs is allocated to the data set. At step 318 the method ends.

Modifications, additions, or omissions may be made to method 300. The method may include more, fewer, or other steps. Additionally, steps may be performed in any suitable order, in parallel, and/or sequentially. Any suitable component of may perform one or more steps of method 300.

Figure 4:
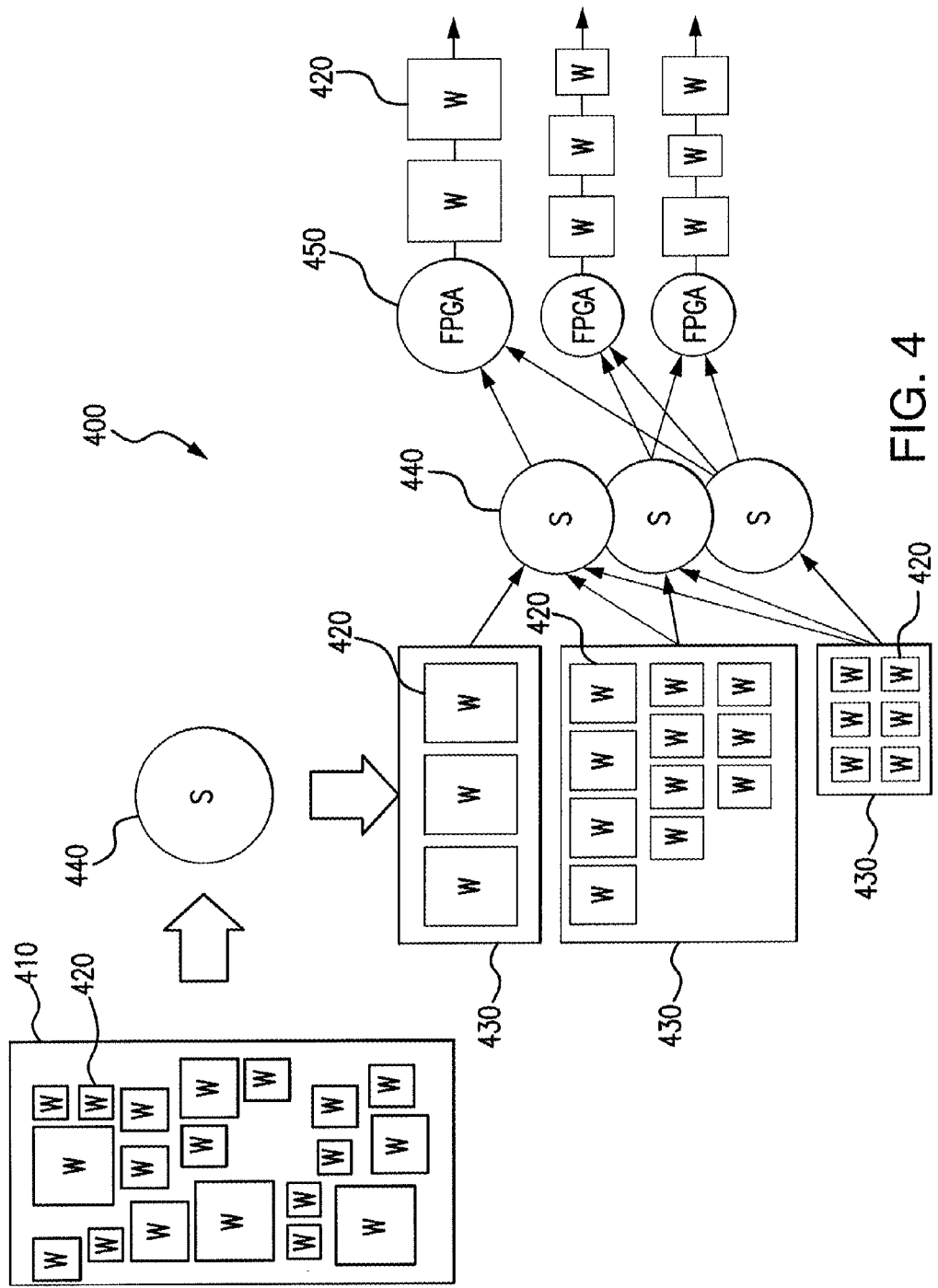
FIG. 4 illustrates a block diagram of an example system for allocating field-programmable gate array (FPGA) resources according to the processing requirements of data sets.

FIG. 4 illustrates a block diagram of an example system 400 for allocating field-programmable gate array (FPGA) resources according to the processing requirements of data sets. According to an embodiment, system 400 includes data set 410, work items 420, work profile 430, scheduler 440, and FPGAs 450.

Data set 210 represents data that needs to be processed. In an embodiment, data set 210 comprises a number of work items 420. Work items 420 represent subsets of data sets that need to be processed. Work items 420 may be associated with one or more algorithms, where work items 420 associated with an algorithm need to be processed according to that algorithm. In certain embodiments, algorithms associated with work items 420 are performed by a pipeline circuit implemented on FPGAs 450. In an embodiment, FPGAs 450 are operable to be dynamically reconfigured such that a single FPGA 450 may execute different pipeline circuits performing different algorithms.

Work profile 430 represents a categorized set of work items 420 from data set 410. Work profile 430 may categorize work items 420 according to the processing requirements of the work items 420. For example, certain work items 420 may have large processing requirements and require FPGAs 450 with larger processing capacities, or may have a smaller processing requirements and allow FPGAs 450 with smaller processing capacities to process the work items 420. Work profile 430 may be generated by scheduler 440.

In an embodiment, scheduler 440 is operable to categorize work items 420 from data set 410 into work profile 430. Scheduler 440 may categorize work items 420 and/or FPGAs 450 according to particular criteria, which may be received from a user (e.g., via user module 150), such as the processing requirements of the work items 420 or the processing capacities of FPGAs 450. In an embodiment, scheduler 440 may categorize work items 420 into groups based on the processing capacities of FPGAs 450. For example, if system 400 included FPGAs 450 with three different levels of processing capacities, scheduler 440 may categorize work items 420 into groups such that the groups of work items 420 correspond to the processing capabilities of FPGAs 450.

Scheduler 440 may be further operable to allocate FPGAs 450 to work items 420 according to the work profile 430. For example, scheduler 440 may allocate FPGAs 450 to work items 420 according to work profile 430 in a bottom up approach, where FPGAs 450 with the lowest processing capacities are allocated first to work items 420 with the lowest processing requirements, then allocating more powerful FPGAs 450 when the remaining work items 420 exceed the processing capacities of FGPAs 450 with the lowest processing capacities. In this way, scheduler 440 may efficiently allocate work items 420 to FPGAs 450 according to work profile 430 to maximize the processing capacities of the available FPGAs 450.

FPGAs 450 represent integrated circuits that contain an array of programmable logic blocks and reconfigurable interconnects that allow the programmable logic blocks to be interconnected in different configurations. The programmable logic blocks may be configured to simulate hardware elements such as combinational logic and logic gates. FPGAs 240 may be configured using a hardware description language (HDL). In certain embodiments, one or more of FPGAs 240 may be dynamically reconfigurable. FPGAs 130 may implement certain algorithms, for example, through pipeline circuits programmed into the FPGAs 240. Algorithms implemented in pipeline circuits may be referred to as pipelined algorithms. In particular embodiments, pipelined circuits implementing processing algorithms for data sets may have different pipeline depths. The pipeline depth of a pipeline circuit represents the number of clock cycles between when data is input to the pipeline circuit and when the results are output from the pipeline circuit.

In the illustrated embodiment, scheduler 440 categorizes work items 420 from data set 410 into work profile 430 based on the processing requirements of the work items 420. Scheduler 440 may also categorize FPGAs 450 into three groups according to the processing capacities of FPGAs 450. In the illustrated embodiment, scheduler 430 categorizes FPGAs 450 into three groups and categorizes work items 420 into work profile 430 comprising three groups such that the processing requirements of work items 420 correspond to the processing capacities of FPGAs 450. For example, scheduler 440 may categorize work items 420 such that processing requirements of the first category of work items 420 does not exceed the maximum processing capacity of the first category of FPGAs 450, the processing requirements of the second category of work items 420 does not exceed the maximum processing capacity of FPGAs 450 in the second group of FPGAs 450, and the processing requirements of the third group of work items 420 does not exceed the maximum processing capacity of the third group of FPGAs 450.

In the embodiment, work profile 430 allows scheduler 440 to allocate FPGAs 450 from the first group of FPGAs 450 to any of the first group, the second group, or the third group of work items 420 because the processing capacities of FPGAs 450 in the first group of FPGAs 450 exceed the processing requirements of work items 420 in the first group, the second group, and the third group of work items 420. Scheduler 440 may allocate FPGAs 450 from the second group of FPGAs 450 to any of the second group or the third group of work items 420 because the processing capacities of FPGAs 450 in the second group of FPGAs 450 exceed the processing requirements of work items 420 in the second group and the third group of work items 420. Scheduler 440 may allocate FPGAs from the third group of FPGAs 450 to the third group of work items 420 because the processing capacities of FPGAs 450 in the third group of FPGAs 450 exceed the processing requirements of work items 420 in the third group of work items 420.

In certain embodiments, the size (e.g., number of logic gates and/or LUTs) of FPGAs 450 in the plurality of FGPAs 450 is based on work profiles 430 of data sets 410. For example, data sets 410 associated with particular information (e.g., option pricing) may have similar work profiles 430. These work profiles 430 can be used to determine the types of FPGAs 450 in the plurality of FPGAs 450. For example, if work profile 430 contains mostly small work items (requiring a low number of logic gates and/or LUTs) and few large work items (requiring a high number of logic gates and/or LUTs), FPGAs 450 may contain mostly small FPGAs 450 and fewer large FPGAs 450. In this way, work profiles 430 of data sets 410 can be used to determine the sizes (and therefore costs) of FPGAs 450. As the costs for FPGAs 450 can range from the tens of dollars to the tens of thousands of dollars, work profiling can reduce the FPGA 450 costs required to process data sets 410.

Modifications, additions, or omissions may be made to system 400. System 400 may include more, fewer, or other components. Any suitable component of system 400 may include a processor, interface, logic, memory, or other suitable element.

Figure 5:
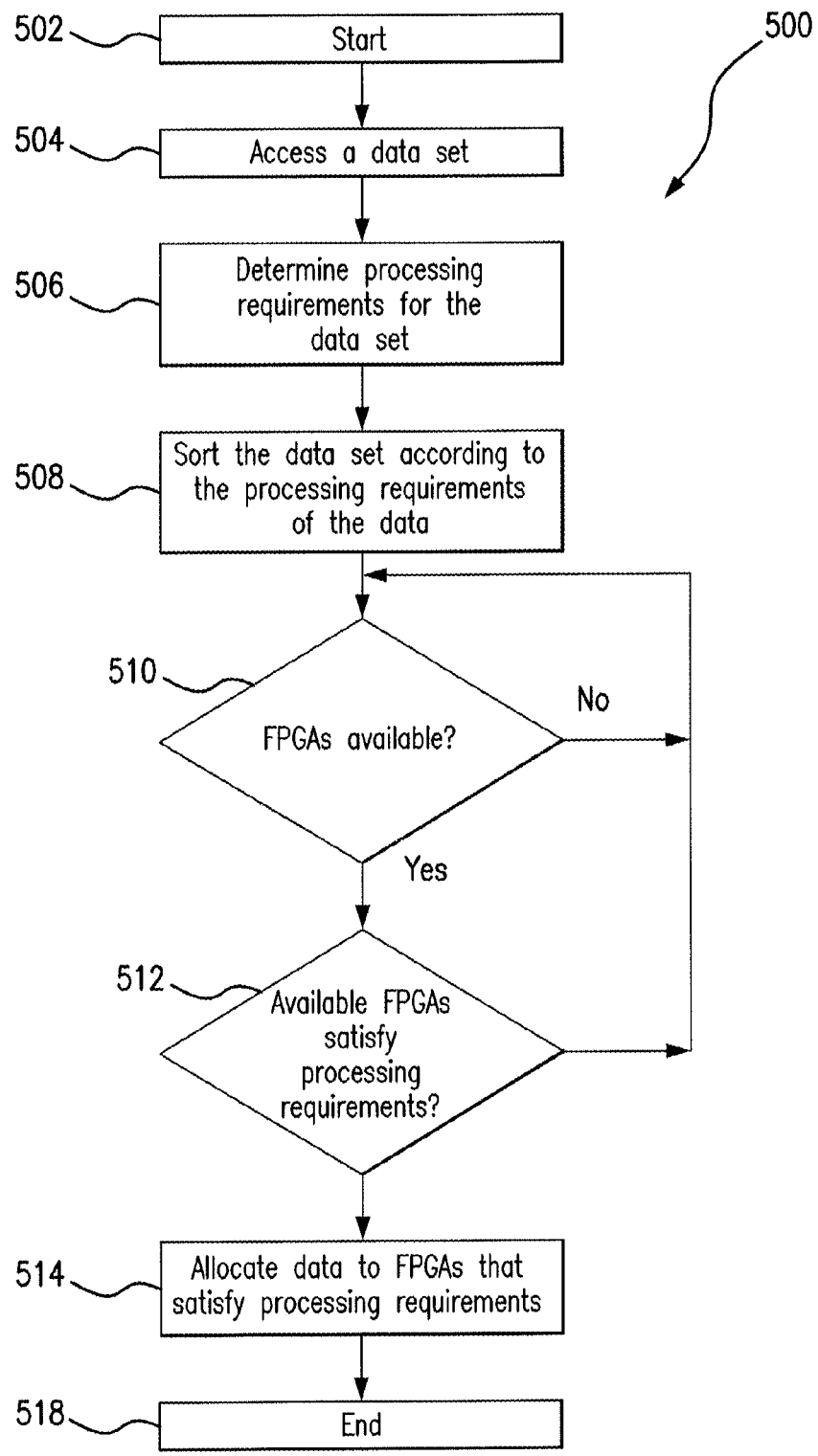
FIG. 5 illustrates a flow diagram of an example method for allocating field-programmable gate array (FPGA) resources according to the processing requirements of data sets, according to certain embodiments of the present disclosure.

FIG. 5 illustrates a flow diagram of an example method 500 for allocating field-programmable gate array (FPGA) resources according to the processing requirements of data sets, according to certain embodiments of the present disclosure.

Method 500 begins at step 502. At step 504, a data set is accessed and at step 506 it the processing requirements for the data set are determined (e.g., by scheduling module 140). At step 508, the data is sorted (e.g., by scheduling module 140) according to the processing requirements of the data. At step 510, it is determined (e.g., by scheduling module 140) whether any FPGAs are available to process the data. If there are no FPGAs available, the method returns to step 510. If there are FPGAs available, the method continues to step 512 and it is determined (e.g. by scheduling module 140) whether the available FPGAs satisfy the processing requirements of the data. If the available FPGAs do not satisfy the processing requirements of the data, the method returns to step 510. If the available FPGAs do satisfy the processing requirements of the data, the method continues to step 514. At step 514, data is allocated (e.g., by scheduling module 140) to FPGAs that satisfy the processing requirements of the data. At step 518 the method ends.

Modifications, additions, or omissions may be made to method 500. The method may include more, fewer, or other steps. Additionally, steps may be performed in any suitable order, in parallel, and/or sequentially. Any suitable component of may perform one or more steps of method 500.

In certain embodiments, the system determines a minimum number of FPGAs to allocate to process a data set within an available time, thereby conserving FPGA resources consumed by over allocating FPGAs to ensure that data sets are processed within the available time.

In an embodiment, the system determines the amount of time an allocated number of FPGAs will need to process a data set and generates an error notification if the processing time for the FPGAs exceeds the determined processing time, thereby allowing for faster processing of data sets by identifying processing errors in real-time.

In particular embodiments, the system categorizes data within data sets based on processing requirements of the data and categorizes FPGAs based on processing capacity, then allocates FPGAs to data based on the category of FPGA and the category of the data, thereby conserving FPGA resources consumed by allocating high processing capacity FGPAs to data with low processing requirements.

Other technical advantages of the present disclosure will be readily apparent to one skilled in the art from the following figures, descriptions, and claims. Moreover, while specific advantages have been enumerated above, various embodiments may include all, some, or none of the enumerated advantages.

What is claimed is:

1. A system for allocating field-programmable gate array (FPGA) resources, comprising:
    a plurality of FPGAs operable to implement one or more pipeline circuits, the plurality of FPGAs comprising FPGAs of different processing capacities; and
    one or more processors operable to:
        access a set of data comprising a plurality of work items to be processed, wherein each of the plurality of work items is associated with a pipeline circuit;
        determine processing requirements for each of the plurality of work items based at least in part on the pipeline circuit associated with each of the plurality of work items, wherein the processing requirements comprise a processing time for each of the plurality of work items;
        sort the plurality of work items according to the determined processing requirements;
        determine available FPGAs from the plurality of FPGAs;
        determine processing capacities dynamically for each of the available FPGAs, wherein the processing capacity for an available FPGA is based at least in part on:
            the number of programmable logic gates implemented by the available FPGA; and
            an operational clock speed of the available FPGA; and
        allocate each of the plurality of work items to one of the available FPGAs based on the processing capacities of the available FPGAs, wherein no FPGA is allocated a work item with processing requirements that exceed the processing capacity of the FPGA.

2. The system of claim 1, wherein one or more of the plurality of FPGAs are dynamically reconfigurable such that one FPGA may implement any of a plurality of pipeline circuits.

3. The system of claim 1, wherein work items with processing requirements that exceed the processing capacity of any of the plurality of FPGAs are processed by a microprocessor.

4. The system of claim 1, wherein the sorted plurality of work items comprises a work profile and the one or more processors are further operable to allocate the FPGAs to the work items according to the work profile.

5. The system of claim 1, the one or more processors further operable to sort the plurality of FPGAs according to the processing capacities of the FPGAs and sort the plurality of work items based at least in part on the processing capacities of the sorted plurality of FPGAs.

6. The system of claim 1, the one or more processors further operable to allocate the FPGAs to work items such that the FPGAs with the lowest processing capacity are allocated first to work items with the lowest processing requirements.

7. The system of claim 1, the one or more processors further operable to allocate the FPGAs to work items such that the FPGAs with the highest processing capacity are allocated first to work items with the highest processing requirements.

8. A non-transitory computer readable medium comprising logic for allocating field-programmable gate array (FPGA) resources, the logic when executed by a processor operable to:
   access a set of data comprising a plurality of work items to be processed, wherein each of the plurality of work items is associated with a pipeline circuit;
   determine processing requirements for each of the plurality of work items based at least in part on the pipeline circuit associated with each of the plurality of work items, wherein the processing requirements comprise a processing time for each of the plurality of work items;
   sort the plurality of work items according to the determined processing requirements;
   determine available FPGAs from a plurality of FPGAs, wherein each FPGA is operable to implement one or more pipeline circuits;
   determine processing capacities dynamically for each of the available FPGAs, wherein the processing capacity for an available FPGA is based at least in part on:
      the number of programmable logic gates implemented by the available FPGA; and
      an operational clock speed of the available FPGA; and
   allocate each of the plurality of work items to one of the available FPGAs based on the processing capacities of the available FPGAs, wherein no FPGA is allocated a work item with processing requirements that exceed the processing capacity of the FPGA.

9. The non-transitory computer readable medium of claim 8, wherein one or more of the plurality of FPGAs are dynamically reconfigurable such that one FPGA may implement any of a plurality of pipeline circuits.

10. The non-transitory computer readable medium of claim 8, wherein work items with processing requirements that exceed the processing capacity of any of the plurality of FPGAs are processed by a microprocessor.

11. The non-transitory computer readable medium of claim 8, wherein the sorted plurality of work items comprises a work profile and the logic is further operable to allocate the FPGAs to the work items according to the work profile.

12. The non-transitory computer readable medium of claim 8, the logic further operable to sort the plurality of FPGAs according to the processing capacities of the FPGAs and sort the plurality of work items based at least in part on the processing capacities of the sorted plurality of FPGAs.

13. The non-transitory computer readable medium of claim 8, the logic further operable to allocate the FPGAs to work items such that the FPGAs with the lowest processing capacity are allocated first to work items with the lowest processing requirements.

14. The non-transitory computer readable medium of claim 8, the logic further operable to allocate the FPGAs to work items such that the FPGAs with the highest processing capacity are allocated first to work items with the highest processing requirements.

15. A method for allocating field-programmable gate array (FPGA) resources, comprising:
   accessing, by one or more processors, a set of data comprising a plurality of work items to be processed, wherein each of the plurality of work items is associated with a pipeline circuit;
   determining, by one or more processors, processing requirements for each of the plurality of work items based at least in part on the pipeline circuit associated with each of the plurality of work items, wherein the processing requirements comprise a processing time for each of the plurality of work items;
   sorting, by one or more processors, the plurality of work items according to the determined processing requirements;
   determining, by the one or more processors, available FPGAs from a plurality of FPGAs, wherein each FPGA is operable to implement one or more pipeline circuits;
   determining, by the one or more processors, processing capacities dynamically for each of the available FPGAs, wherein the processing capacity for an available FPGA is based at least in part on:
      the number of programmable logic gates implemented by the available FPGA; and
      an operational clock speed of the available FPGA; and
   allocating, by one or more processors, each of the plurality of work items to one of the available FPGAs based on the processing capacities of the available FPGAs, wherein no FPGA is allocated a work item with processing requirements that exceed the processing capacity of the FPGA.

16. The method of claim 15, wherein one or more of the plurality of FPGAs are dynamically reconfigurable such that one FPGA may implement any of a plurality of pipeline circuits.

17. The method of claim 15, wherein work items with processing requirements that exceed the processing capacity of any of the plurality of FPGAs are processed by a microprocessor.

18. The method of claim 15, wherein the sorted plurality of work items comprises a work profile and the method further comprises allocating the FPGAs to the work items according to the work profile.

19. The method of claim 15, further comprising sorting the plurality of FPGAs according to the processing capacities of the FPGAs and sort the plurality of work items based at least in part on the processing capacities of the sorted plurality of FPGAs.

20. The method of claim 15, further comprising allocating the FPGAs to work items such that the FPGAs with the highest processing capacity are allocated first to work items with the highest processing requirements.

* * * * *